United States Patent Office 2,929,328
Patented Mar. 22, 1960

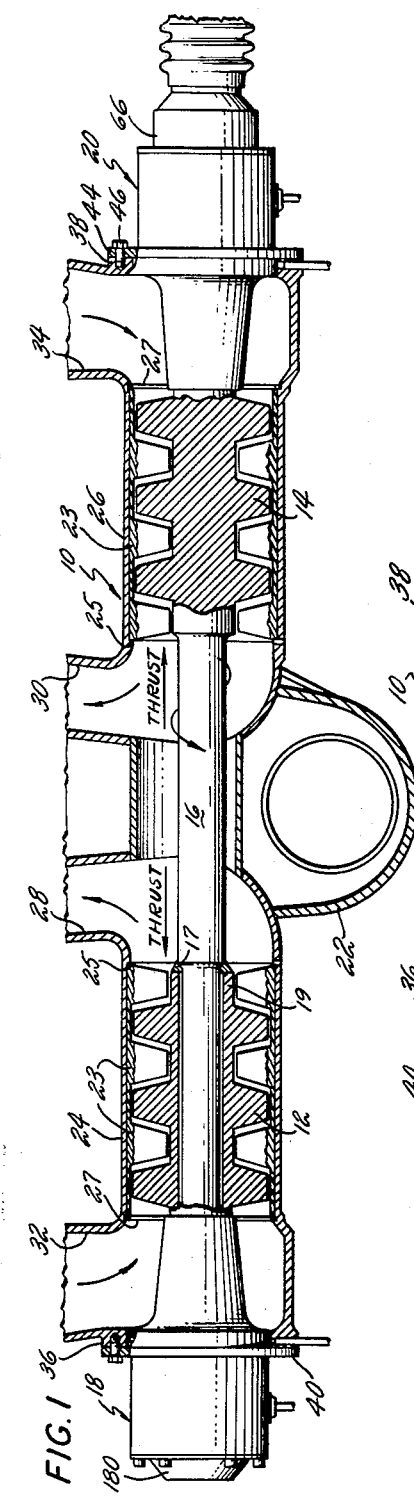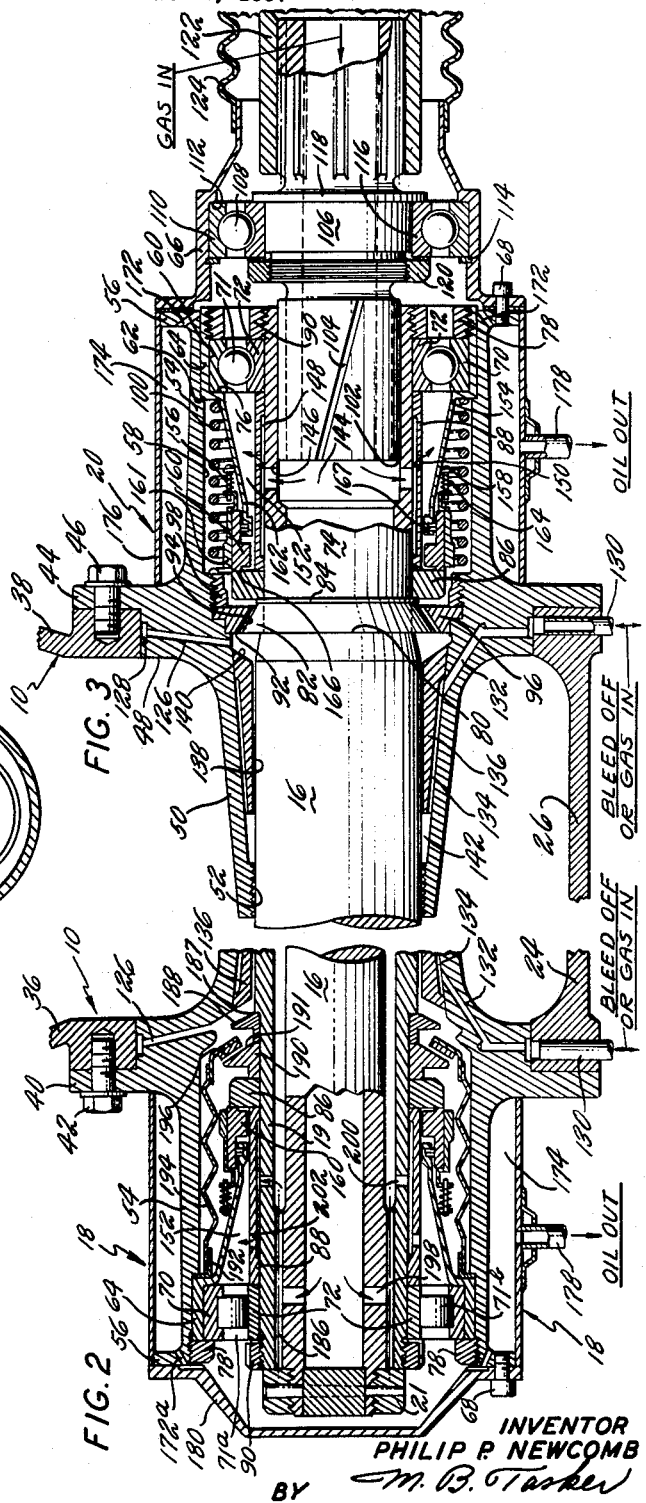

2,929,328

TORQUE RESPONSIVE SEAL

Philip P. Newcomb, Manchester, Conn., assignor to United Aircraft Corporation, East Hartford, Conn., a corporation of Delaware Application January 4, 1957, Serial No. 632,533

14 Claims. (Cl. 103—92)

This invention relates to pumping apparatus and particularly to improved sealing means suitable for use in pumps, and the like, handling highly corrosive liquids at high temperatures.

In a pump for handling liquid metals, for example, a seal must be provided which will prevent the fluid being pumped from leaking from the pump cavity into the bearing cavities, both when the pump is rotating and when it is stationary. Further, the seal must be capable of withstanding extreme heat without deterioration and must not be adversely affected by the corrosive properties of the fluid.

It is an object of the present invention to provide sealing means for a liquid metal pump, or the like, which meets these requirements.

Dynamic seals have been used and are effective when the pump is rotating. Also, it has been known to use gas pressure to oppose the pressure of the fluid being pumped; however, such seals are not effective once the pump has stopped rotating.

Another object of this invention is, therefore, to provide a metal to metal seal which is effective when the pump is not rotating, a dynamic seal effective when the pump is rotating, and a gas pressure seal which cooperates with the two aforementioned seals in preventing leakage into the bearing cavities, especially during the transition period when the pump is being started or stopped.

A further object of the invention is to provide a metal to metal contacting static seal having means for positively disengaging the metal seal parts when driving torque is applied to the pump drive shaft.

A yet further object of the invention is to provide a static seal of this type in which one of the metal parts is spring biased into engagement with its metal seat.

A further object of the invention is to provide a pump having thrust opposed impellers on a common shaft discharging between the impellers with a static seal located on the pump shaft at the low pressure side of each impeller.

A further object of the invention is to provide a static seal of this type at one end of the shaft in which both the metal seal and its metal seat are individually and independently spring loaded in a direction to urge them into sealing engagement when the pump is stationary.

A further object is generally to improve the construction and operation of seals for liquid metal pumps.

These and other objects and advantages of the invention will be pointed out in connection with the preferred embodiment of the invention shown in the accompanying drawings.

In these drawings:

Fig. 1 is an elevation, partly in section, of a liquid metal pump embodying the invention;

Fig. 2 is an enlarged sectional detail showing the sealing means on one end of the pump shaft; and Fig. 3 is an enlarged sectional detail of the sealing means at the other end of the pump shaft showing the pump drive connection.

In Fig. 1 an improved horizontal thrust balanced pump is shown having the sealing means of this invention. Essentially, the pump comprises a central casing 10 enclosing two pump impellers 12 and 14, an axial shaft 16 to which the impellers are fixed which extends through and projects beyond the casing at both ends, and end housings 18 and 20 secured to the casing at opposite ends about the projecting ends of the shaft. Housings 18 and 20 form extensions of casing 10 and carry the bearings which support shaft 16 as well as the sealing means of this invention which isolate the shaft bearings from the corrosive material handled by the pump.

Considering the casing more particularly it will be noted that it comprises a central duct supporting portion 22 and oppositely extending horizontal tubular portions 24 and 26 which house the impellers 12 and 14. Central portion 22 is provided with adjacent pump discharge passages 28 and 30 receiving the fluid discharged from impellers 12 and 14 respectively. Impeller enclosing portions 24 and 26 are likewise provided with pump inlet passages 32 and 34 which communicate with the remote ends of the impellers 12 and 14. Impeller 14 has its blades formed integral with shaft 16. At the other end of the pump, shaft 16 has a shoulder 17 against which impeller sleeve 19 of impeller 12 abuts. Sleeve 19 is held fixed to shaft 16 by a nut 21 which is threaded onto the end of the shaft and bears against the left-hand end of sleeve 19 (Fig. 2). The stationary blading of the two impellers is identical except for pitch and comprises a sleeve 23 abutting a shoulder 25 on the housing extensions. The sleeves are held in place by snap rings 27. The blading on impellers 12 and 14 is such that the thrust reaction of the fluid being pumped by the impellers is outward as indicated by the arrows in Fig. 1 to provide a thrust balanced pumping mechanism.

Casing portions 24 and 26 are provided at their remote ends with attaching flanges 36 and 38 to which the end housings 18 and 20 are detachably secured. To this end, housing 18 is provided with attaching flange 40 which is secured to flange 36 by cap screws 42. Similarly, end house 20 is provided with flange 44 which is secured to flange 38 by cap screws 46.

Referring first to the end housing 20 at the right-hand end of Fig. 1, it will be noted that this housing for the projecting end of shaft 16 extends both to the left and right of flange 44. At the left of flange 44 the housing has a thickened portion 48 which merges into a tapered axial extension 50 closely surrounding shaft 16, the extension 50 being tapered both on its inside and outside walls. At its extremity this extension 50 is provided with an internally grooved land 52 which closely overlies the external cylindrical surface of shaft 16 and provides a labyrinth seal.

The portion of housing 20 which extends to the right of flange 44 comprises an integral axial flange extension 54, terminating in the radial attaching flange 56. The flange 54 has a cylindrical inner surface 58 including a shorter cylindrical recess 60 adjacent its outer end forming a shoulder 62. A bearing supporting shell 64 is free for limited axial sliding movement in recess 60. This sliding movement is limited by shoulder 62 in one direction and by flanged cap 66 in the other direction. Cap 66 is secured to flange 56 by cap screw 68. The outer race 70 of a ball bearing 71 is received in bearing shell 64, the inner race 72 of which supports a reduced portion 74 of shaft 16. Outer race 70 abuts a shoulder 76 on shell 64 and is held against this shoulder by a nut 78 threaded into the end of shell 64 and bearing against race 70.

The reduced portion 74 of shaft 16 forms a shoulder 80 against which a ring-shaped poppet valve 82 is seated.

The valve is removably held in place by a snap ring 84 seated in an annular groove in the reduced portion 74 of the shaft. On the right-hand side of ring 84 a seal ring 86 is provided which is held against the ring by a spacer sleeve 88 against which the inner race 72 of the ball bearing 71 abuts. This whole assembly is clamped in place by a nut 90 which is threaded onto the extremity of the hollow extension 74 of the shaft. It will thus be evident that the bearing 71 comprising the inner race 72 and outer race 70 is rigidly carried by the shaft and constitutes the main bearing for supporting the right-hand end of the shaft in end housing 20.

The valve ring 82 has an oblique valve face 92 which cooperates with a mating face 94 on an annular valve seat 96 which is held in place in the bottom of a recess formed by surface 58 by a nut 98. A heavy compression spring 100 is located in this recess, one end of which bears against nut 98 and the other end of which bears against a shoulder on bearing shell 64. Spring 100 thus constantly biases bearing shell 64, bearing 71, and shaft 16 to the right in Fig. 3, causing the oblique face 92 of valve 82 to seat on the mating valve surface 94 and form a positive barrier against leakage of fluid from the pump into the bearing cavity. It will be noted that the valve ring 82 and its seat 96 are both removable and replaceable. In the event that liquid metals are being pumped, both these parts would be made of stainless steel or other corrosive resistant and temperature resistant materials.

The reduced portion 74 of shaft 16 is hollow and has an enlarged splined socket 102 the splines of which are oblique to receive correspondingly oblique splines 104 on the left-hand end of a drive shaft 106. Shaft 106 is independently supported in cap 66 of end housing 20 by a ball bearing 108 which is fixed against axial movement in the housing and on the shaft. To accomplish this the outer race 110 is seated against a shoulder 112 in cap 66 and is held thereagainst by a snap ring 114. The inner race 116 is seated against a shoulder flange 118 on shaft 106 and is held against this flange by a nut 120. The outer extremity of shaft 106 has a spline connection with a hollow drive shaft 122 which is enclosed by a gas tight boot 124 for purposes hereinafter described.

It will be evident that when drive shaft 106 is rotated counterclockwise, as viewed from the right-hand end of Fig. 3, the oblique splines 104 acting in the splined socket 102 will cause shaft 16 and valve 82 thereon to move to the left in Fig. 3, resulting in the forcible opening of valve 82.

A dynamic seal is also provided which is effective when the pump is rotating. To this end a plurality of radial passages 126 are provided at the thickened portion 48 of housing 20 at the base of extension 50 where its internal diameter is the greatest. These communicate with an annular passage 128 from which leaking fluid may be bled off through a pipe 130. Rotating valve 82 also acts as a fluid slinger to discharge any leakage fluid into passages 126.

Gas under pressure, such as helium, may also be introduced through pipe 130, passages 132 in base 48, and spline passages 134 in a sleeve 136. This sleeve has a cylindrical inner surface 138 which closely overlies shaft 16 and a tapered outer surface in which the splines 134 are cut which conforms to the taper in the inner surface of extension 50. The sleeve is adapted to be a forced fit in this extension. Also, at its larger end the sleeve is provided with an oblique surface 140 which is directed toward the radial passages 126. It will be evident that gas admitted through pipe 130, passages 132, and spline passages 134, will build up a pressure in the annular chamber 142 which will effectively oppose leakage of fluid along the shaft and into the bearings 71 and 108.

An inert gas, such as helium, is also admitted through the axial passage in shaft 106 to chamber 144. This gas passes through holes 146 in shaft portion 74 into a space 148 between shaft portion 74 and spacing sleeve 88. This sleeve is provided with holes 150 through which the gas passes into a space 152 formed by a conical extension 154 of the bearing shell 64. This extension carries a plurality of pins 156 which are supported by tabs 158 secured to the outer surface of extension 154. An annular face seal 160 is carried by an annular support 161 having clips 162 which slide on pins 156 and are constantly biased to the left in Fig. 3 by springs 164 on the pins. The seal 160 has an annular face 166 which bears against seal ring 86. In addition to its support on pins 156 seal 160 is also supported on the annular extremity of extension 154 at 167.

The gas under pressure in chamber 152 passes through the ball bearing 71 into the bearing cavity for ball bearing 108 and escapes through passages 172 into a chamber 174 formed by a cylinder 176 which connects flanges 44 and 56. This chamber is vented through a pipe 178.

At the left-hand end of the pump there is no drive shaft corresponding to shaft 106 and accordingly this shaft and its bearing, as well as the cap 66, are replaced by an end closure cap 180 which is secured to flange 56 of housing 18 by cap screws 68. Sleeve 19 which carries the rotating vanes for impeller 12 extends into housing 18 and is splined at 186 to the end of shaft 16. As previously noted, a nut 21 on shaft 16 abuts the end of sleeve 19 and holds the latter against the shoulder 17 on shaft 16 so that sleeve 19 moves axially as a unit with shaft 16. Sleeve 19 has a shoulder 187 against which an annular slinger 188 abuts. This slinger directs any leakage fluid into the passages 126. Abutting against slinger 188 is a valve member 190 having a conical valve face 191. Abutting valve 190 is the face seal 86, spacer 88, and inner race 72 of a roller bearing 71a. A nut 90 holds the parts 72, 88, 86, 190 and 188 in assembled position on sleeve 19. The outer ball race 70 is seated in a recess in bearing supporting shell 64 and is held therein by a nut 78 as previously described in Fig. 3. It will be noted that the inner cylindrical race 72 of bearing 71a has a straight outer cylindrical surface and thus is free for axial movement with shaft 16 and sleeve 19 as these move relative to rollers 71b. Rollers 71b are held between opposed shoulders on outer race 70.

Bearing supporting shell 64 has an angular ring 192 fixed thereto which carries one end of a spring type bellows 194. The bellows 194 carries the cooperating valve member 196 of the static seal which comprises an oblique annular metallic ring adapted to seat against the inclined face 191 of valve 190. The bellows type spring 194 which supports the valve member 196 is so chosen that in its natural position, when 190 is moved to the left by spline 104 as in Fig. 2, valve member 190 is separated from valve member 196. However, after the pump has been running for some time and shaft 16 has grown, the valve members 196 and 190 will still firmly mate to form an effective seal when the pump is stopped and spring 100 has moved shaft 16 to the right to close valve 82 against its seat 96 (Fig. 3).

The same gas seal is provided at this end of the shaft that was described in connection with Fig. 3. Thus, gas entering pipe 130 flows through passages 132, 134, to provide a gas seal against leakage along shaft 16 from the pump. Likewise, gas introduced through the hollow shaft 106 passes through holes 198 in shaft 16, along the spline connection 186, through holes 200, through holes 202 in spacer 88 and into chamber 152 where it acts to prevent leakage of fluid from the pump past the face seal 86, 160. From this chamber the gas passes through the bearing 71a, passage 172a, and into chamber 174 which is vented by pipe 178. The seal 86 and its cooperating face seal 160 supported by the conical extension of the bearing support shell 64 is identical with the structure at the other end of the pump shown in Fig. 3. Here relative rotation takes place between seal ring 86, which rotates with sleeve 19, and 160 which does not rotate.

In the operation of the pump thus far described it will be noted that impellers 12 and 14 are so bladed that the low pressure, or intake, sides of both impellers are adjacent the sealed ends of the shaft so that the seals are not subjected to pump discharge pressure. When the pump is operating, the torque on drive shaft 122 is exerted against the splines 104 on shaft 106 to drive shaft 16. Since shaft 106 is held against axial movement in the housing by its bearing 108 the torque exerting on shaft 106, due to the inclination of the spline 104, will impart an axial component of thrust to shaft 16. The rotation of drive shaft 106 as viewed from the right-hand end of Fig. 3 is counterclockwise and accordingly shaft 16 is moved forcibly to the left in Fig. 3 to open and hold the poppet valve 82 open, as shown in Fig. 3, during rotation of the pump. If the valve 82 sticks to its seat 96 while the pump is not running, the initial torque applied to shaft 16 will break it loose. At the same time that valve 82 is moved to the left valve 190 is also moved away from its seat 196 due to axial movement of shaft 16.

As the pump rotates, any fluid which may escape along shaft 16 past the labyrinth seals 52 and past the tapered sleeves 136 will be discharged through the radial passages 126. This leakage is limited, however, by the gas seal formed by gas and flowing through passages 132 and 134 into the annular chambers 142. This gas seal is particularly effective during stopping and starting periods when the dynamic seal is less effective and while valves 82 and 190 are still open.

Bearings 71, 108 and 71a are further protected by the gas seals provided by gas entering through the bore in shaft 106 and flowing through passages 146 and 150 in Fig. 3, and passages 198, 202 in Fig. 2, into chamber 162. Gas under pressure in chambers 152 prevents leakage of fluid past the face seals 86, 160 into the bearing cavities.

When torque is removed from drive shaft 122 spring 100 immediately seats the poppet valves 82 and 190 on seats 96 and 196 to form positive barriers against fluid leakage from the pump cavities into the bearing cavities while the pump is not rotating.

If the valves 82 or 190 stick to their seats, as is frequently the case when handling hot metals and other corrosive substances, the initial rotation of shaft 16 through the action of splines 104 will break the valves free from their seats and open the latter against the action of spring 100. Thus the oblique splines 104 serve a dual function in holding the valve open during the rotation of the pump and insuring that the valves will open, if they are stuck to their seats, when the pump is started.

It will be evident from the above description of one embodiment of the invention that a pump has been provided in which the thrust of the two impellers oppose each other and in which the shaft seals at the opposite ends of the pump are subjected only to the low intake pressures of the fluid being pumped.

It will also be clear that sealing means has been provided which is particularly well adapted to a pump for handling liquid metals or other corrosive substances at high temperatures. Further, that a combination of sealing means have been provided which effectively prevent access of the pumped fluid to the bearings when the pump is running, when the pump is stopping, and under the conditions of stopping and starting the pump.

It will also be noted that the danger of sticking of a static seal in the presence of high temperature liquid metals has been overcome by the provision of the helical spline drive in combination with the axially floating pump shaft which carries one member of the static seal, whereby fusing and welding together of the static seal parts is prevented.

While only one embodiment of the invention has been shown and described by way of illustration it will be understood that various changes may be made in the construction and arrangements of the parts without departing from the invention.

I claim:

1. In a pump, an elongated casing having fluid inlet passages adjacent its ends and a central fluid discharge passage, pump impellers on opposite sides of said discharge passage each receiving fluid from an inlet passage and discharging fluid through said discharge passage, a pump shaft extended through said casing and driving said impellers, end housings secured to said casing at opposite ends thereof into which said shaft extends, a bearing for said shaft in each of said housings, means for effecting a static seal between said shaft and said casing between the inlet end of each impeller and the adjacent bearing for said shaft comprising a metallic valve having stationary and movable valve members, one of which is carried by said casing and the other by said shaft, means responsive to the initial rotation of said shaft for positively actuating said movable valve members and for maintaining said valve members separated when said shaft is rotating, and means for biasing one of said members into valve closing position when said shaft is stationary.

2. In a pump, an elongated casing having fluid inlet passages adjacent its ends and a central fluid discharge passage, pump impellers on opposite sides of said discharge passage each receiving fluid from an inlet passage and discharging fluid through said discharge passage, a pump shaft extended through said casing and driving said impellers, end housings secured to said casing at opposite ends thereof into which said shaft extends, a bearing for said shaft in each of said housings, means for effecting a fluid seal between said shaft and said casing inboard of each of said bearings including a valve in each of said housings having a movable valve member rotatable with said shaft and a cooperating stationary valve member carried by said casing, a drive shaft having a driving connection with said pump shaft at one end of the latter, and cooperating means carried by said shaft and said casing and responsive to torque initially applied to said drive shaft for moving said pump shaft axially to open said valves.

3. In a pump, an elongated casing having fluid inlet passages adjacent its ends and a central fluid discharge passage, pump impellers on opposite sides of said discharge passage each receiving fluid from an inlet passage and discharging fluid through said discharge passage, a pump shaft extended through said casing and driving said impellers, end housings secured to said casing at opposite ends thereof into which said shaft extends, a bearing for said shaft in each of said housings, means for effecting a fluid seal between said shaft and said casing inboard of each of said bearings including a valve in each of said housings having a movable valve member rotatable with said shaft and a cooperating stationary valve member carried by said casing, a drive shaft having a driving connection with said pump shaft at one end of the latter, and cooperating means carried by said shaft and said casing and responsive to initial rotation of said drive shaft to move said pump shaft axially to open said valves.

4. In a pump, an elongated casing having fluid inlet passages adjacent its ends and a central fluid discharge passage, pump impellers on opposite sides of said discharge passage each receiving fluid from an inlet passage and discharging fluid through said discharge passage, a pump shaft extended through said casing and driving said impellers, end housings secured to said casing at opposite ends thereof into which said shaft extends, a bearing for said shaft in each of said housings, means for effecting a fluid seal between said shaft and said casing inboard of each of said bearings including a valve in each of said housings having a movable valve member rotatable with said shaft and a cooperating stationary valve member carried by said casing, a drive shaft having a driving connection with said pump shaft at one end of the latter, cooperating means carried by said shaft and said casing and responsive to initial rotation of said drive shaft to move said pump shaft axially to open said sealing valves, and means for constantly biasing said pump shaft axially to seat said valves.

5. In a pump, an elongated casing having fluid inlet passages adjacent its ends and a central fluid discharge passage, pump impellers on opposite sides of said discharge passage each receiving fluid from an inlet passage and discharging fluid through said discharge passage, a pump shaft extended through said casing and driving said impellers, end housings secured to said casing at opposite ends thereof into which said pump shaft extends, a bearing for said shaft in each of said housings, said shaft being supported for a limited axial movement relative to said casing, a static seal in each of said housings for protecting said bearings from fluid being pumped, said seal comprising cooperating stationary and movable valve members, one of which is carried by said shaft and the other of which is carried by said casing, means for biasing said shaft axially into valve closing position, a drive shaft extended into one of said housings, and an oblique spline connection between said shafts for exerting an axial thrust on said pump shaft in a direction to overcome said shaft biasing means and open said valve upon rotation of said drive shaft.

6. In a pump, an elongated casing having fluid inlet passages adjacent its ends and a central fluid discharge passage, pump impellers on opposite sides of said dicharge passage each receiving fluid from an inlet passage and discharging fluid through said discharge passage, a pump shaft extended through said casing and driving said impellers, end housings secured to said casing at opposite ends thereof into which said pump shaft extends, a bearing for said shaft in each of said housings, said shaft being supported for a limited axial movement relative to said casing, a static seal in each of said housings for protecting said bearings from fluid being pumped, said seal comprising a metallic poppet valve carried by said pump shaft having a conical valve face and a metallic mating seat carried by said casing, passages in said casing extending radially from adjacent the outer diameter of said poppet valve for receiving fluid discharged by said valve when it is rotating, means for biasing said shaft axially into valve closing position, a drive shaft extended into one of said housings, a bearing in said housing for said drive shaft for holding said drive shaft against axial movement, and an oblique splined connection between said drive shaft and said pump shaft for exerting axial thrust on the latter in a direction to open said valve upon rotation of said drive shaft.

7. In a pump, an elongated casing having fluid inlet passages and discharge passages, a pump shaft extended through said casing, pump impellers on said shaft, end housings secured to said casing at opposite ends thereof into which said pump shaft extends, a bearing for said shaft in each of said housings, said shaft being supported in said casing for limited axial movement relative thereto, a valve in each of said housings comprising cooperating stationary and movable members, one of which is carried by said shaft and the other of which is carried by said casing, means for biasing said shaft axially into position to close both of said valves, and a drive shaft extended into one of said housings having an oblique splined connection with said pump shaft for exerting an axial thrust on the latter in a direction to overcome said shaft biasing means and open said valves upon rotation of said drive shaft.

8. In a pump, a casing having fluid inlet and outlet passages, a pump impeller receiving fluid from said inlet passage and discharging fluid through said outlet passage, a pump shaft in said casing for driving said impeller, said shaft extending outwardly through said casing, a housing secured to the casing into which said shaft extends, a bearing carried by said shaft in said housing, a bearing shell carried by said bearing and slidably carried by said housing for limited axial movement of said shaft, bearing, and shell relative to said housing, a static seal between said shaft and said housing including a valve member carried by said shaft and a cooperating seat carried by said housing, a face seal between said shaft and said bearing shell comprising a seal ring carried by said shaft and a cooperating face seal carried by said shell, a spring for biasing said shaft, bearing, and bearing shell axially to close said valve, means for admitting gas under pressure into said bearing cavity, a drive shaft extending into said housing having a splined connection with said pump shaft, the splines of said connection being helical and inclined relative to the direction of rotation of said shaft in a direction to produce an axial thrust on said shaft to oppose said biasing means and open said static valve upon initial rotation of said drive shaft.

9. A rotary pump for pumping liquid metals comprising a casing, a pump shaft extended through said casing, impeller means in said casing driven by said shaft, said casing including a housing carried by said casing at each end of said shaft into which said shaft extends, a bearing for said shaft in each of said housings, said shaft being free to limited axial movement in said housing, valve means providing a closure between the liquid being pumped and each of said bearings when the pump is not rotating, said valve means including an axially movable valve member carried by said shaft in each of said housings and a cooperating stationary valve member carried by said housings, means for constantly biasing said shaft in an axial direction to close said valves, a drive shaft extended into one of said housings having a driving connection with said pump shaft, said connection including cooperating oblique splines on said shafts in which the spline angle is so related to the directional rotation of the shafts as to produce an axial thrust on said pump shaft opposing said biasing means to positively open said valves upon rotation of said drive shaft.

10. In a pump, a casing, a hollow pump shaft extended through said casing, housing carried by said casing and enclosing the ends of said shaft, an impeller in said casing driven by said shaft, bearing in said housings for supporting said shaft, said shaft being free for a limited axial movement in said casing, a valve in each of said housings comprising a poppet valve carried by said shaft and a cooperating seat carried by said housing, a hollow drive shaft extended into one of said housings and telescoping with said pump shaft, means for supporting said drive shaft against axial movement, and an oblique splined connection between said drive shaft and said pump shaft for exerting an axial thrust on said pump shaft upon rotation of said drive shaft for forcibly opening said valves, and means for closing said valve including a spring in one of said housings for constantly biasing said pump shaft axially in a valve closing direction.

11. In a pump, a casing, a hollow shaft extended through said casing, housings carried by said casing and enclosing the ends of said shaft, an impeller in said casing driven by said pump shaft, bearings in said housings for supporting said shaft, said shaft being free for a limited axial movement in said casing, static seal means including a valve in each of said housings comprising a poppet valve carried by said shaft, and a cooperating seat carried by the respective housings, a hollow drive shaft extended into one of said housing and telescoping with said pump shaft, means for supporting said drive shaft against axial movement, and an oblique splined connection between said drive shaft and said pump shaft for exerting axial thrust on said pump shaft upon rotation of said drive shaft for forcibly opening said valves, means for closing said valves including a spring in one of said housings for constantly biasing said pump shaft axially in a valve closing direction, means for introducing gas under pressure through said drive shaft into said pump shaft, and passage means through said pump shaft for admitting said gas into said housings between said pump shaft bearings and said valves.

12. In a pump assembly as recited in claim 11 in which a seal ring is carried by said shaft in each of said housings outboard of said poppet valves, and cooperating face seals are carried by said housings, and means are provided for admitting the gas under pressure entering through said drive shaft into the space between each of said face seals and the adjacent bearing.

13. A pump assembly as claimed in claim 11 in which one of the relatively stationary valve members of the static seal means is resiliently mounted on its housing, whereby it will engage its cooperating poppet valve under varying conditions of expansion of said pump shaft.

14. A static seal for a pump having a casing through which a pump shaft extends, a poppet valve carried by the shaft comprising an annular ring on the shaft having an oblique face and a seat carried by said casing having a mating oblique face, a drive shaft extended into said casing having a telescoping driving connection with said pump shaft, bearing means supporting said pump shaft for limited axial movement in said casing, bearing means for said drive shaft fixing the latter against axial movement, said driving connection comprising oblique cooperating splines on said telescoping shafts, the inclination of said splines being such as to urge said pump shaft in a valve opening direction upon rotation of said drive shaft, and means for biasing said pump shaft axially in a direction to close said valve.

References Cited in the file of this patent
UNITED STATES PATENTS

| | | |
|---|---|---|
| 1,493,045 | Leiman | May 6, 1924 |
| 2,106,600 | Hepler | Jan. 25, 1938 |
| 2,209,109 | Bungartz | July 23, 1940 |
| 2,441,708 | Luaces | May 18, 1948 |
| 2,555,492 | Kidney | June 5, 1951 |